United States Patent
Farooq et al.

(10) Patent No.: US 9,387,780 B2
(45) Date of Patent: Jul. 12, 2016

(54) VERTICALLY ADJUSTABLE VEHICLE SEATBACK

(71) Applicant: Ford Global Technologies, LLC, Dearborn, MI (US)

(72) Inventors: Iskander Farooq, Novi, MI (US); Mohammed Omar Faruque, Ann Arbor, MI (US); Scott H. Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/332,479

(22) Filed: Jul. 16, 2014

(65) Prior Publication Data

US 2016/0016488 A1      Jan. 21, 2016

(51) Int. Cl.
    *A47C 7/44* (2006.01)
    *B60N 2/22* (2006.01)
    *B60N 2/20* (2006.01)

(52) U.S. Cl.
    CPC .. *B60N 2/22* (2013.01); *B60N 2/20* (2013.01); *B60N 2002/2204* (2013.01)

(58) Field of Classification Search
    CPC .............. A47C 7/44; A47C 1/03; A47C 7/40
    USPC ............. 297/354.12, 383, 257, 301.1, 301.2, 297/229, 218.3, 446.1, 353
See application file for complete search history.

(56) References Cited

U.S. PATENT DOCUMENTS

| | | | |
|---|---|---|---|
| 2,148,953 A | | 2/1939 | Meissner |
| 2,509,102 A | * | 5/1950 | Kuebler ................. A47C 7/402 297/353 |
| 2,779,031 A | * | 1/1957 | Arpin .................................. 5/38 |
| 3,291,527 A | | 12/1966 | Hall et al. |
| 3,378,300 A | | 4/1968 | Costin |
| 3,985,388 A | | 10/1976 | Hogan |
| 5,518,296 A | * | 5/1996 | Compardo ................. 297/378.1 |
| 5,836,651 A | | 11/1998 | Szerdahelyi et al. |
| 6,394,542 B2 | * | 5/2002 | Potisch et al. ................. 297/182 |
| 6,447,062 B1 | | 9/2002 | Jaekel et al. |
| 7,255,395 B2 | | 8/2007 | Garrido |
| 7,390,062 B2 | * | 6/2008 | Hahn ....................... 297/362.13 |
| 7,547,068 B2 | | 6/2009 | Davis |
| 7,775,599 B2 | | 8/2010 | George et al. |
| 2003/0214166 A1 | | 11/2003 | Schambre et al. |
| 2004/0239162 A1 | * | 12/2004 | Wiberg ....................... 297/218.3 |
| 2005/0017561 A1 | * | 1/2005 | Burmeister ............ B60N 2/015 297/354.12 |
| 2008/0246322 A1 | * | 10/2008 | Opsvik .................... 297/354.12 |

FOREIGN PATENT DOCUMENTS

WO    2013158911    10/2013

* cited by examiner

*Primary Examiner* — Syed A Islam
(74) *Attorney, Agent, or Firm* — Vichit Chea; Price Heneveld LLP (57) ABSTRACT

A vehicle seat includes a seat base, a seatback and a vertical guide frame connecting a rear portion of the seat base to a bottom portion of the seatback. The bottom portion of the seatback slidably engages the vertical guide frame. At least one actuator is adapted to move the seatback between a plurality of vertical positions relative to the seat base.

18 Claims, 7 Drawing Sheets

VERTICALLY ADJUSTABLE VEHICLE SEATBACK

FIELD OF THE INVENTION

The present invention generally relates to vehicle seating, and more specifically, vehicle seating including a seatback that is vertically adjustable relative to the seat base.

BACKGROUND OF THE INVENTION

The seating located within the passenger cabin of the various vehicles is designed to provide comfort for individuals of varying body types. Accordingly, various portions of the vehicle seating can be adjustable to ensure that most any individual who sits within the vehicle is provided with a sufficient comfort level during operation of the vehicle.

SUMMARY OF THE INVENTION

According to one aspect of the present invention, a vehicle seat includes a seat base, a seatback and a vertical guide frame connecting a rear portion of the seat base to a bottom portion of the seatback. The bottom portion of the seatback slidably engages the vertical guide frame. At least one actuator is adapted to move the seatback between a plurality of vertical positions relative to the seat base.

According to another aspect of the present invention, a vehicle seat includes a frame having a base section, a back section and a vertical guide member operably connecting the base and back sections. At least one actuator is coupled to the back section and adapted to vertically operate the back section within the vertical guide member between a plurality of vertical positions.

According to another aspect of the present invention, a vehicle seat includes a seatback operably connected to a seat base. A guide member at least partially connects the seatback to the seat base. An actuator is adapted to vertically operate the seatback between a plurality of vertical positions relative to the seat base.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
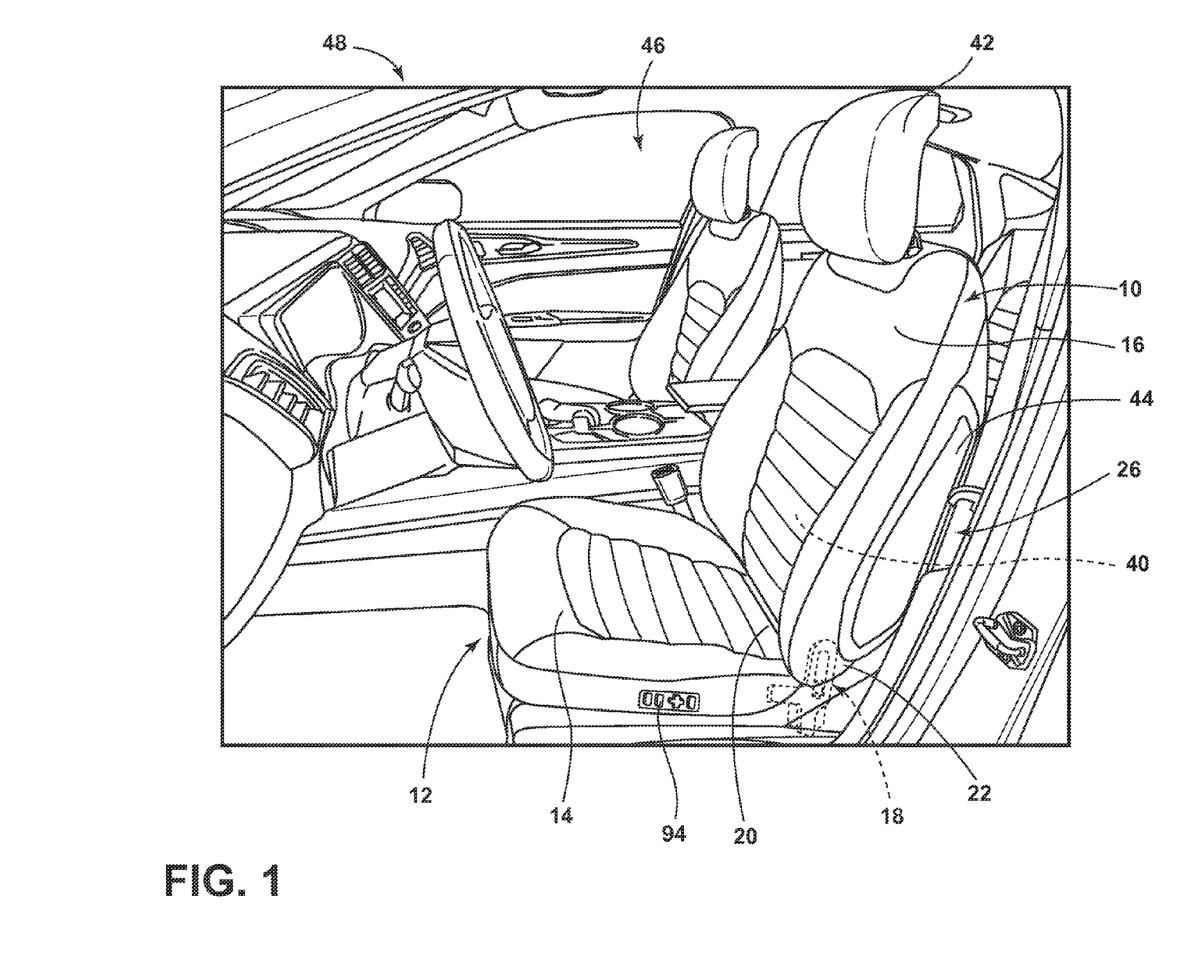
FIG. 1 is a side perspective view of the passenger cabin of a vehicle with an embodiment of the vertically adjustable seatback assembly installed therein.
Figures 2, 3:
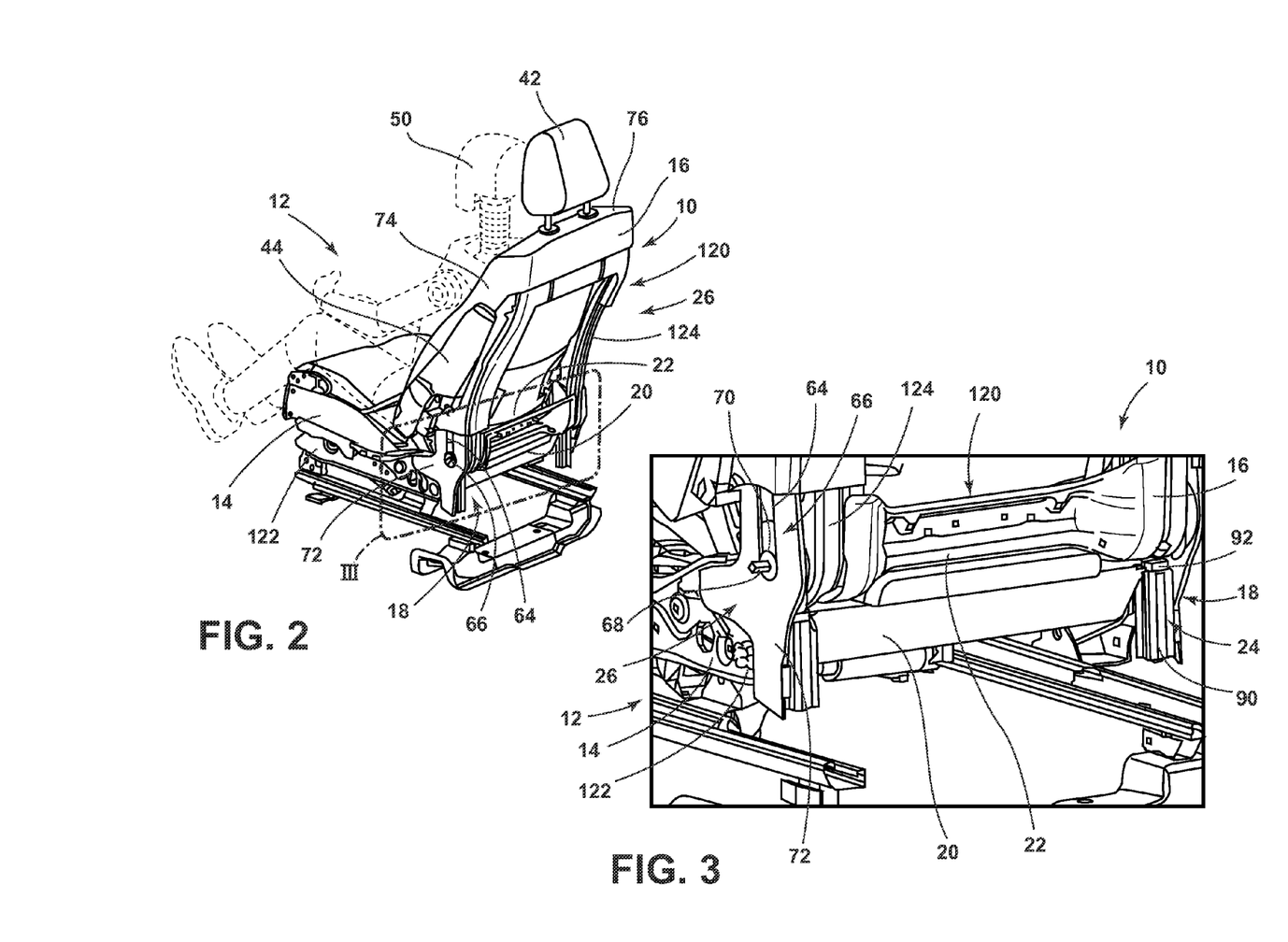
FIG. 2 is a rear perspective view of a vehicle seat removed from the passenger cabin with an alternate embodiment of the vertically adjustable seatback assembly installed therein and the seatback in the lowered position.
FIG. 3 is an enlarged perspective view of the vehicle seat of FIG. 2 taken at area III.
Figures 4, 5:
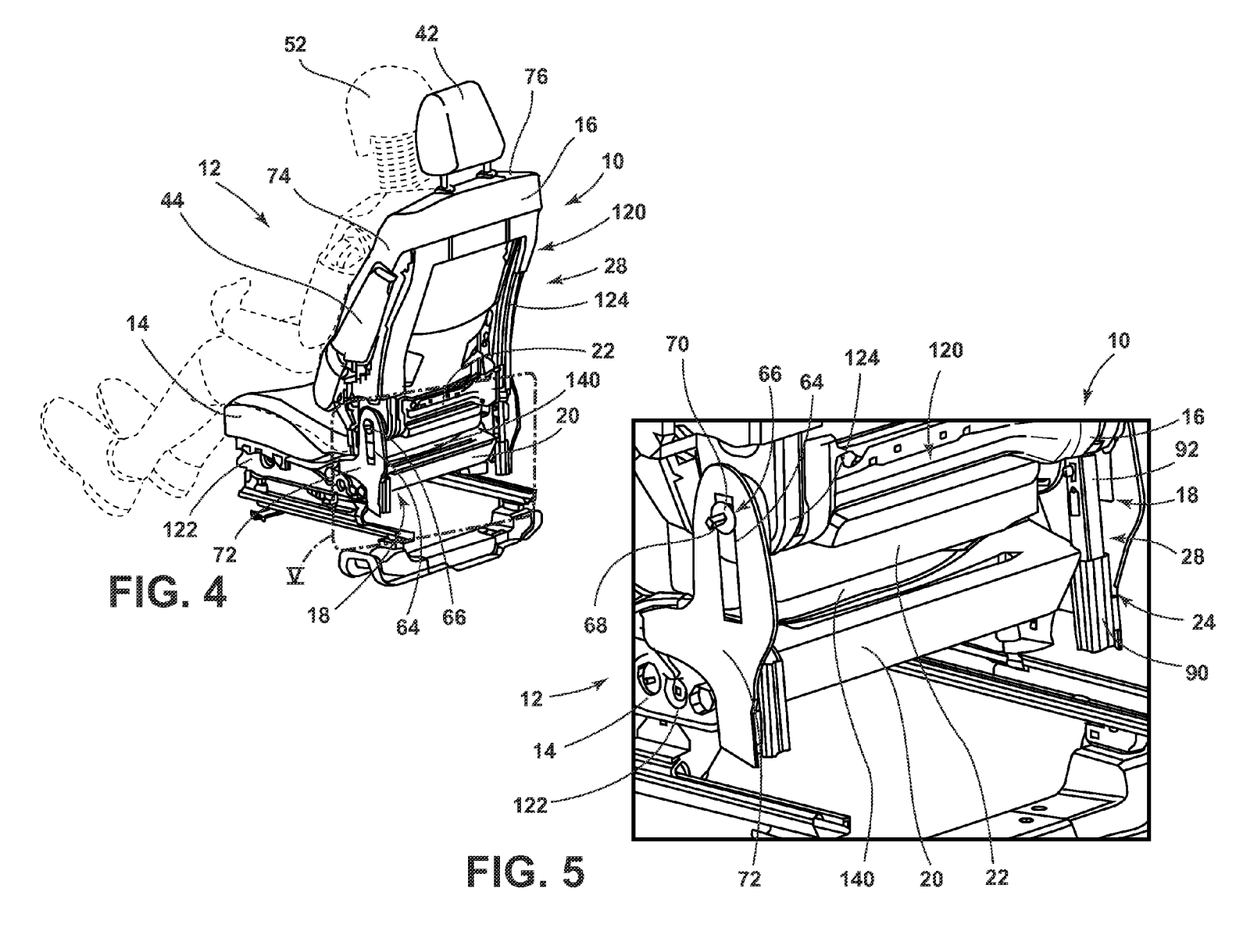
FIG. 4 is a rear perspective view of the vehicle seat of FIG. 2 with the seatback in the raised position.
FIG. 5 is an enlarged perspective view of the vehicle seat of FIG. 4 taken at area V.
Figure 6:
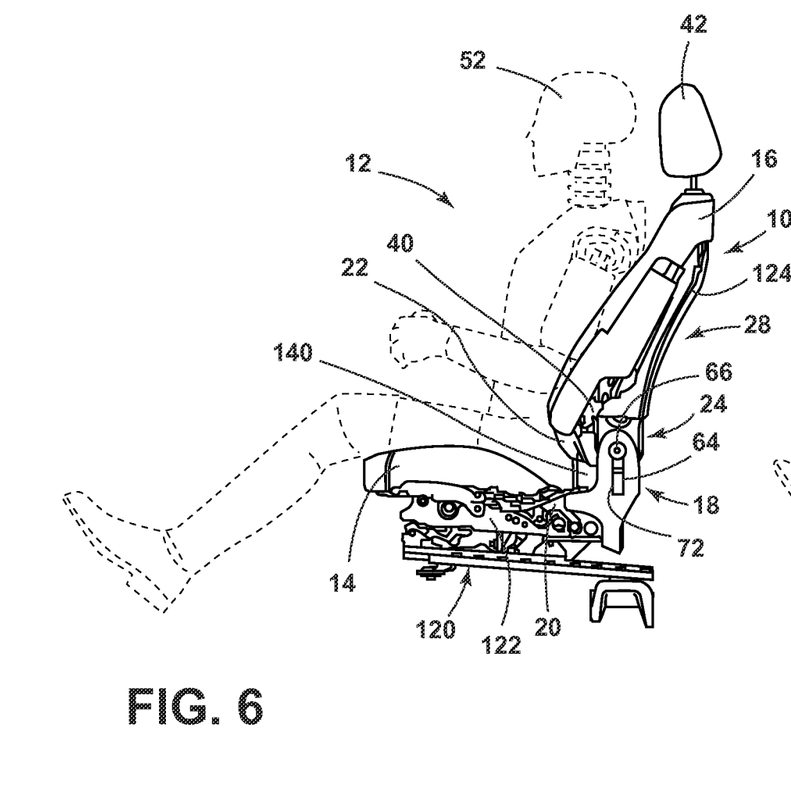
FIG. 6 is a side elevational view of the vehicle seat of FIG. 4.
Figure 7:
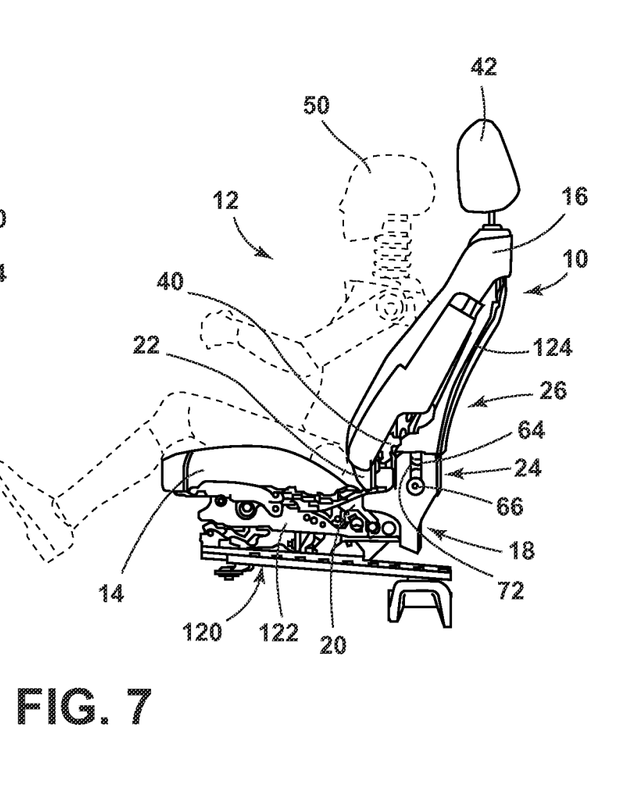
FIG. 7 is a side elevational view of the vehicle seat of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to a vertically adjustable seatback assembly for a vehicle seat 12, according to one embodiment. The vehicle seat 12 includes a seat base 14 and a seatback 16. A vertical guide frame 18 is adapted to connect a rear portion 20 of the seat base 14 to a bottom portion 22 of the seatback 16. The bottom portion 22 of the seatback 16 slidably engages the vertical guide frame 18. At least one actuator 24 is adapted to move the seatback 16 between a plurality of vertical positions, including lowered and raised positions 26, 28, relative to the seat base 14.

Referring again to FIGS. 1-7, the vertically adjustable seatback assembly 10 is configured to provide comfort functionality to individuals of varying heights. In conventional seating, the seatback 16 is not vertically operable such that individuals having a height outside of the median ranges may not be provided with sufficient back support during operation of the vehicle 48. As such, the lumbar support 40, headrest 42, armrests 44, and other portions of the vehicle seat 12 may not be in an appropriate position for non-median-height occupants. The various embodiments of the vertically adjustable seatback assembly 10 are configured to provide comfort functionality to these individuals having heights within the upper and lower extremes, while also providing comfort to individuals having substantially average heights. By incorporating the vertically adjustable seatback assembly 10 into the passenger cabin 46 of the vehicle 48, a seatback 16 in the lowered position 26 can substantially align the various aspects of the seatback 16 to conform to a less-than-average-height individual 50. Accordingly, the lumbar support portions 40 of the seatback 16, the headrest 42, armrests 44, and other portions of the vehicle seat 12 that are incorporated within or attached to the seatback 16 are properly aligned to provide comfort to the less-than-average-height individual 50. Conversely, when the vertically adjustable seatback assembly 10 is in the raised position 28, the various portions incorporated within and attached to the seatback 16 are substantially aligned to provide comfort functionality to taller-than-average-height individuals 52.

As shown in the embodiment of FIGS. 2-7, the vertical guide frame 18 of the vertically adjustable seatback assembly 10 can include one or more slots 64 oriented in a generally vertical direction that are adapted to guide the movement of the seatback 16 between the plurality of vertical positions. In the various embodiments, the bottom portion 22 of the seatback 16 includes at least one protrusion 66 that engages the slot 64 of the vertical guide frame 18. In this manner, the protrusion 66 of the bottom portion 22 of the seatback 16 slidably engages the slot 64 to allow the seatback 16 to operate between the lowered and raised positions 26, 28, and various positions in between.

According to the various embodiments, as illustrated in FIGS. 2-7, the protrusion 66 of the bottom portion 22 of the seatback 16 can be a post 68 that extends through the slot 64 with a fixing mechanism 70 disposed on the post 68 to secure the post 68 within the slot 64 and also to secure the seatback 16 between the vertical guide frame 18. It is contemplated that the vertically adjustable seatback assembly 10 can include guide members 72 of the vertical guide frame 18 disposed on the left and right sides 74, 76 of the seatback 16 to secure the seatback 16 in various vertical positions relative to the seat base 14. In this embodiment, each portion of the vertical guide frame 18 can include a separate slot 64 that receives a dedicated protrusion 66 that extends from the right and left sides 76, 74 of the seatback 16, respectively. Having the guide members 72 of the vertical guide frame 18 on left and right sides 74, 76 of the seatback 16 also allows the seatback 16 to slide within the slots 64 of the guide members 72 without substantially tilting to the left or right during vertical operation of the seatback 16. Additionally, the protrusion 66 of the bottom portion 22 of the seatback 16 typically includes a single member that extends through the slot 64 of each guide member 72 such that the single protrusion 66 allows for a point of rotation of the seatback 16 to define a plurality of inclined and reclined positions of the seatback 16 when the vertically adjustable seatback assembly 10 is in the lowered and raised position 26, 28, or any position in between.

In the various embodiments, the vertical guide frame 18 of the vertically adjustable seatback assembly 10 can receive the protrusions 66 extending from the seatback 16 within the slot 64, where the slot 64 defines an aperture extending through the vertical guide frame 18. In various alternate embodiments, the slot 64 defined within the vertical guide frame 18 can include a recess defined within a surface of the vertical guide frame 18, where the protrusion 66 of the vertical seatback 16 engages the vertical guide frame 18 but does not pass through the vertical guide frame 18. In such an embodiment, the protrusion 66 of the seatback 16 can include an interference end that slidably engages the vertical guide frame 18. The slot 64 defined within the vertical guide frame 18 can be shaped to receive and substantially retain the interference end of the protrusion 66 in order to support the seatback 16 within the vertical guide frame 18. In various alternate embodiments, portions of the protrusion 66 extending from the seatback 16 can be adapted to both engage and pass through portions of the vertical guide frame 18 in order to secure the seatback 16 between the guide members 72 of the vertical guide frame 18.

Referring again to FIGS. 1-7, the vertically adjustable seatback assembly 10 includes a pair of actuators 24 disposed on right and left sides 76, 74 of the seatback 16, where each of the actuators 24, when activated, operates the seatback 16 between the raised and lowered positions 28, 26. In the various embodiments, each actuator 24 can be a linear actuator 24 that includes an actuator base 90, and an actuator piston 92. The actuator piston 92 slidably engages the actuator base 90 to define a plurality of vertical positions of the actuator 24. The actuator piston 92 can be connected with the bottom portion 22 of the seatback 16 and the actuator base 90 can be connected with the vertical guide frame 18. In this manner, the vertical guide frame 18 can provide the actuator base 90 with a secure mounting position and structural support in order to carry the weight of the seatback 16 as it operates between the raised and lowered positions 28, 26. It is contemplated that the positions of the actuator base 90 and actuator piston 92 can be switched in various embodiments.

In the various embodiments, the operation of the actuator base 90 and actuator piston 92 can be controlled through a hydraulic mechanism, pneumatic mechanism, gearing, or other similar mechanism that allows for the vertical operation of the actuator piston 92 relative to the actuator base 90. It is further contemplated that the movement of the actuator piston 92 within the actuator base 90 can be controlled by a motor that serves to automatically raise and lower the actuator piston 92 within the actuator base 90 to define the raised and lowered positions 28, 26 of the vertically adjustable seatback assembly 10. In such an embodiment, a control 94 that operates the motor for moving the actuator piston 92 can be disposed within the vehicle cabin proximate the other controls 94 for the vehicle seat 12 that include the fore, aft, incline, recline, and other similar controls 94 for the vehicle seat 12. It is also contemplated that the vertically adjustable seatback assembly 10 can be manually operated. Such manual operation can be through levers, dials, knobs or other similar controls 94 that are configured to manually operate the various vertical adjustment mechanisms that make up the one or more actuators 24 of the vertically adjustable seatback assembly 10.

It is further contemplated, in various embodiments, that the actuator 24 can operate vertically between a set of predetermined incremental positions. In such an embodiment, as the actuator 24 moves, it can selectively be retained within one of the various incremental positions by various mechanisms. Such mechanisms can include detents, selectively locking cogs, biased protuberances, and other similar selectively engaging mechanisms. In various alternate embodiments, the actuator 24 can operate smoothly between the raised and lowered positions 28, 26. Accordingly, no set of predetermined positions are included such that substantially precise and minute adjustments of the seatback 16 are possible. Generally, hydraulic, pneumatic, and other similar adjustment mechanisms are used to allow for this smooth and substantially fluid adjustment of the seatback 16 of the vertically adjustable seatback assembly 10.

In various alternate embodiments, the actuator 24 for the vertically adjustable seatback assembly 10 can include other similar vertically adjusting mechanisms for moving the seatback 16 between the raised and lowered positions 28, 26. Such alternate mechanisms can include, but are not limited to, screw-type mechanisms, rack-and-pinion mechanisms, scissor-type mechanisms, and other similar mechanisms for raising and lowering the seatback 16 of the vertically adjustable seatback assembly 10.

Figure 8:
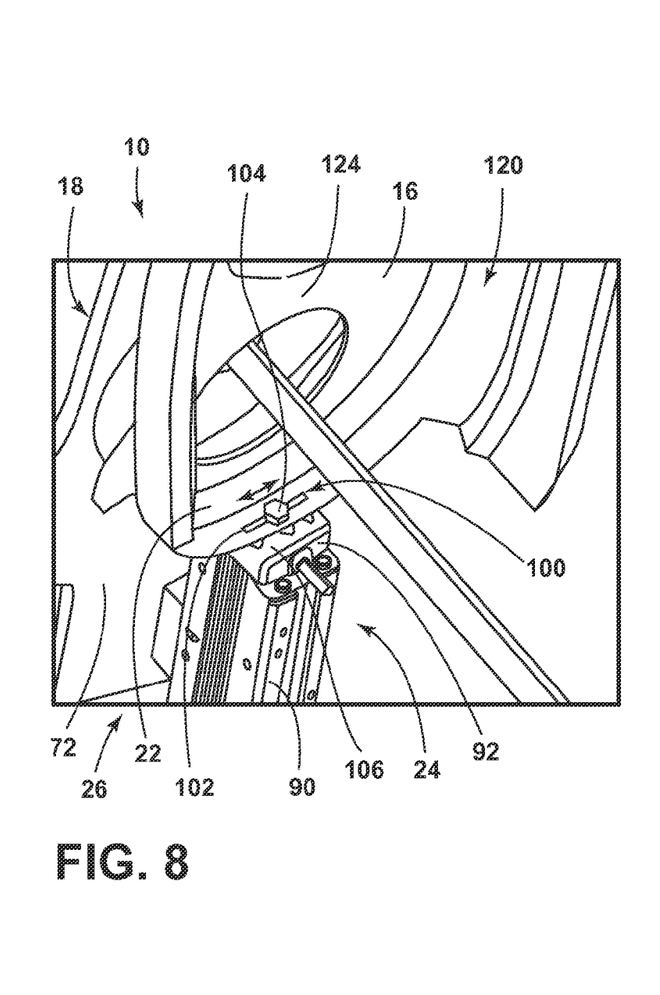
FIG. 8 is a detail perspective view of another alternate embodiment of the vertically adjustable seatback assembly showing the engagement of the actuator and the bottom portion of the seatback, with the seatback in the lowered position.
Figure 9:
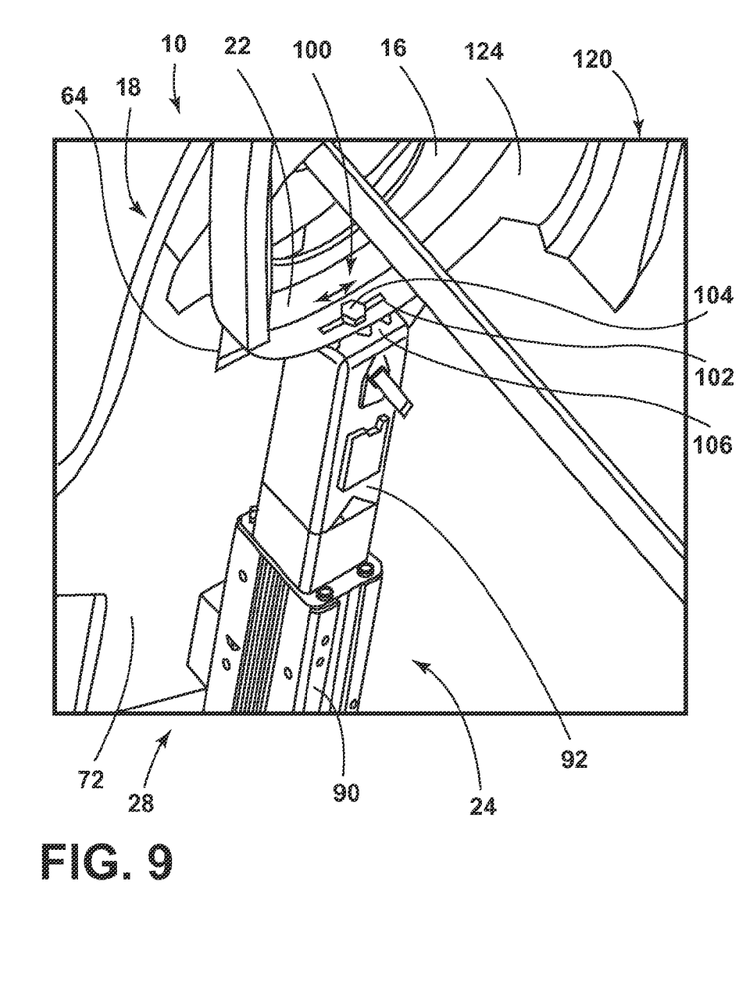
FIG. 9 is a detail perspective view of the vertically adjustable seatback assembly of FIG. 8 with the seatback in the raised position.

Referring again to FIGS. 8 and 9, the actuator 24 of the vertically adjustable seatback assembly 10 can include an actuator piston 92 that is a single piece that operates vertically within the actuator base 90. In various alternate embodiments, the actuator piston 92 can be a telescoping member that extends from and retracts within the actuator base 90, where the actuator piston 92 includes a plurality of members that slidably engage one another to telescope the actuator piston 92 between the raised and lowered position 28, 26.

Referring again to FIGS. 2-7, in the various embodiments, the one or more actuators 24 and the bottom portion 22 of the seatback 16 can cooperate to define a pivot mechanism 100 that is adapted to rotationally operate the seatback 16 between a plurality of angular positions relative to the seat base 14. These angular positions can further define the various inclined and reclined positions of the seatback 16. It is contemplated that the pivot mechanism 100 of the actuator 24 and the bottom portion 22 of the seatback 16 can cooperate with the engagement between the protrusion 66 of the seatback 16 and the slots 64 of the vertical guide frame 18 in order to secure the seatback 16 relative to the seat base 14. Accordingly, while the engagement of the protrusion 66 and slot 64 provides for the inclining and reclining of the seatback 16, the pivot mechanism 100 serves to limit this inclining and reclining movement to within a predetermined range of rotational movement. In the various embodiments, the pivot mechanism 100 of the vertically adjustable seatback assembly 10 includes a groove 102 defined within the bottom portion 22 of the seatback 16 that engages a pin 104 that is disposed within a top portion 106 of the actuator piston 92. Accordingly, as the seatback 16 is moved between the various inclined and reclined positions, the seatback 16 rotates about the protrusions 66 of the seatback 16 that extends through the slots 64 of the vertical guide frame 18. As the seatback 16 rotates about the protrusions 66, the groove 102 defined within the bottom portion 22 of the seatback 16 further guides the angular movement of the seatback 16 about the protrusion 66 by allowing the pin 104 of the actuator piston 92 to slidably engage the groove 102. This cooperative engagement operates to secure the seatback 16 in the various angular positions and also limits the angular movement of the seatback 16 to the various predetermined inclined and reclined positions.

In the various embodiments, the pivot mechanism 100 of the vertically adjustable seatback assembly 10 can include various alternate mechanisms to guide and at least partially limit the rotational movement of the seatback 16 between the inclined and reclined positions. Such rotational mechanisms can include, but are not limited to, gearing mechanisms, interference-type mechanisms, low-friction surface engagements, and other similar rotation-limiting mechanisms.

It is contemplated that, in the various embodiments, the vertical guide frame 18 can be incorporated and/or integrated within the frame of the seat base 14 of the vehicle seat 12. In this manner, the vehicle seat 12 can include the seatback 16 that is operably connected to the seat base 14 and the guide member 72 that at least partially connects the seatback 16 to the seat base 14. In such an embodiment, at least one actuator 24 disposed proximate the guide member 72 is adapted to vertically operate the seatback 16 between a plurality of vertical positions relative to the seat base 14, including the raised and lowered positions 28, 26.

In various alternate embodiments, as illustrated in FIGS. 2-7, the vehicle seat 12 can include a seat frame 120 having a base section 122 and a back section 124, where the guide member 72 operably connects the base and back sections 122, 124 of the vehicle seat 12. In such an embodiment, one or more actuators 24 can be coupled to the back section 124 that are adapted to vertically operate the back section 124 of the vehicle seat 12 within the guide member 72 between the plurality of vertical positions. It is contemplated that, in various embodiments, the guide member 72 can be incorporated within the base section 122 or the back section 124 of the vehicle seat 12. Accordingly, by incorporating the vertical guide member 72 within the seat frame 120 of the vehicle seat 12, the vertically adjustable seatback assembly 10 of the vehicle seat 12 can be made more efficiently and with minimal extra components when compared to conventional vehicle seats.

According to the various embodiments, two actuators 24 can be positioned proximate the left and right sides 74, 76 of the seatback 16. These two actuators 24 operate simultaneously to operate the seatback 16 of the vertically adjustable seatback assembly 10 between the plurality of vertical positions. In various alternate embodiments, a single actuator 24 can be used to operate the seatback 16 of the vertically adjustable seatback assembly 10. In such an embodiment, a portion of the seat frame 120 can extend across the seatback 16 such that the actuator 24 can engage a transverse portion of the seat frame 120. Accordingly, the actuator 24 can be configured to vertically operate the transverse portion, and, in turn, the seatback 16 of the vertically adjustable seatback assembly 10.

Figure 10:
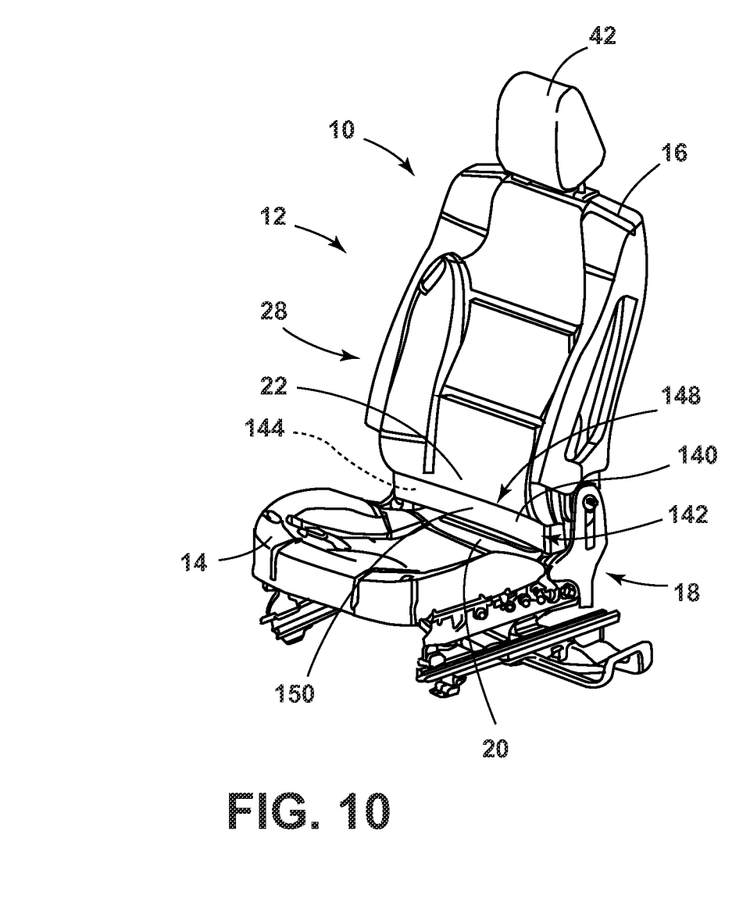
FIG. 10 is a front perspective view of a vehicle seat with another alternate embodiment of the vertically adjustable seatback assembly installed therein, with the seatback in the raised position.
Figure 11:
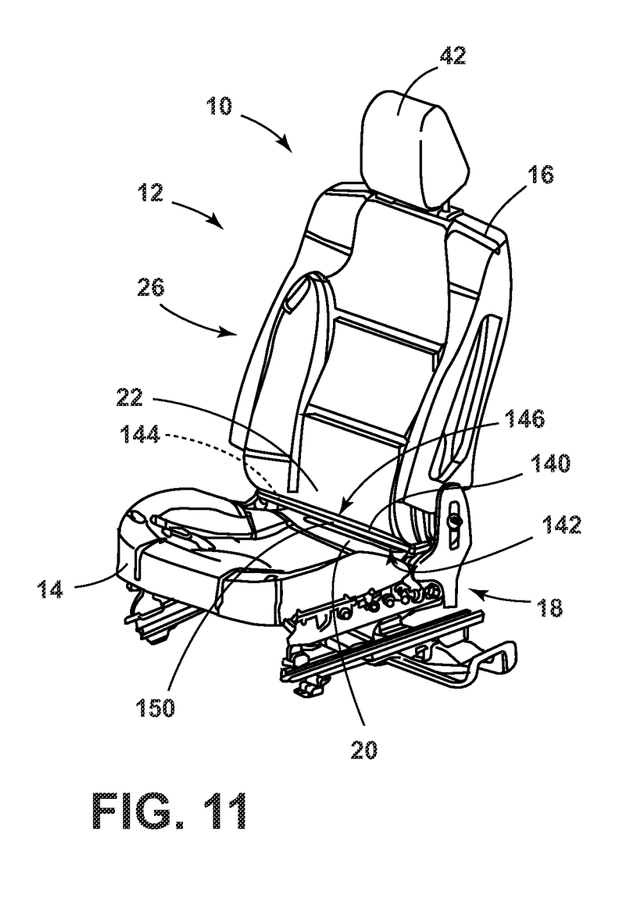
FIG. 11 is a front perspective view of the vehicle seat of FIG. 10 with the seatback in the lowered position.

Referring now to FIGS. 10 and 11, during operation of the seatback 16 of the vertically adjustable seatback assembly 10, as the seatback 16 moves to the raised position, a gap 140 can be formed between the bottom portion 22 of the seatback 16 and the rear portion 20 of the seat base 14. To occupy this space, the vertically adjustable seatback assembly 10 can include a cover member 142 that extends at least partially between the bottom portion 22 of the seatback 16 and the rear portion 20 of the seat base 14. In this manner, the cover member 142 at least partially occupies the gap 140 between the seatback 16 and the seat base 14 to provide additional support to the occupant's back and also to prevent objects and various other items from becoming lodged between the seatback 16 and seat base 14. In the various embodiments, the cover member 142 can be a cushion 144 that extends below the bottom portion 22 of the seatback 16. In such an embodiment, the cushion 144 is disposed in a substantially compressed position 146 when the seatback 16 is in the lowered position 26. When the seatback 16 moves to the raised position, the cushion 144 moves toward an uncompressed position 148 as the seatback 16 is raised. It is contemplated that the cushion 144 can be made of any one of various materials that can include, but are not limited to, foam, rubberized material, plastic, polymers, combinations thereof, as well as other similar compressible materials. It is further contemplated that the cushion 144 that makes up the cover member 142 can include an outer covering 150 that is adapted to substantially match the finish of the vehicle seat 12 within which the cover member 142 is installed. Such outer coverings 150 can include leather, vinyl, plastic, cloth, and other similar materials used as outer coverings 150 for vehicle seating.

Figure 12:
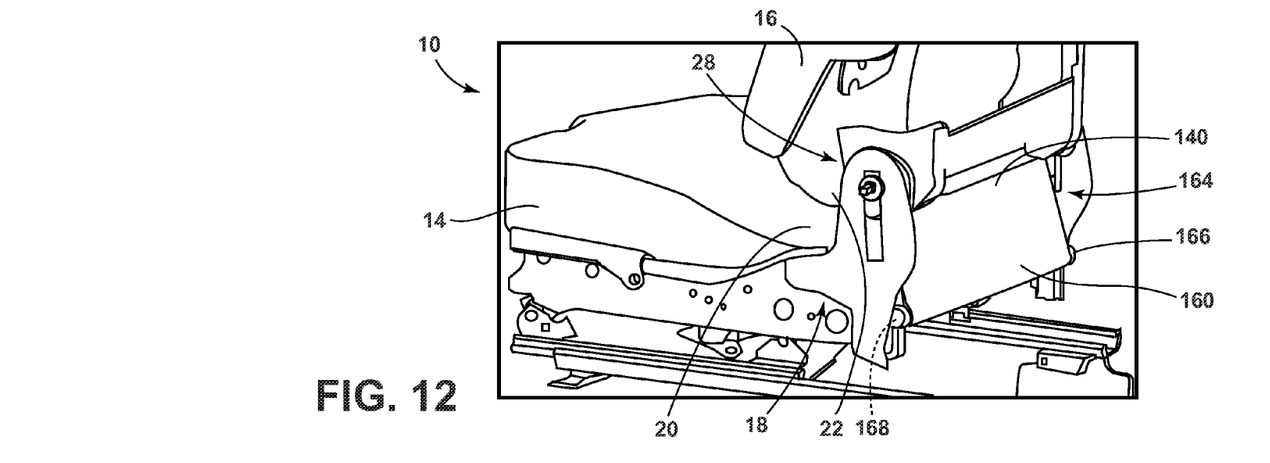
FIG. 12 is an enlarged rear perspective view of a vehicle seat with another alternate embodiment of the vertically adjustable seatback assembly installed therein, and the seatback in the raised position.
Figure 13:
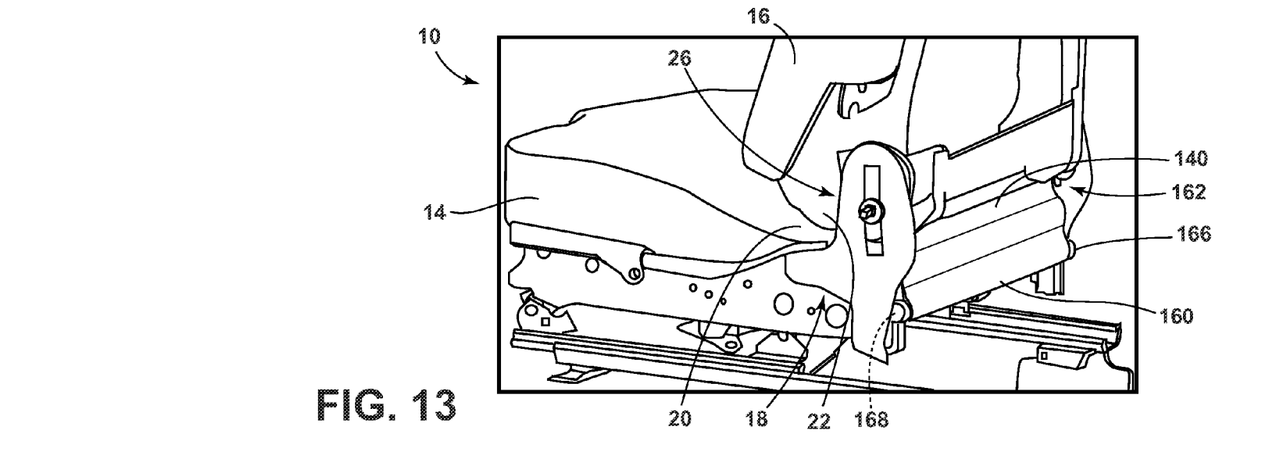
FIG. 13 is an enlarged rear perspective view of the vehicle seat of FIG. 12 with the seatback in the lowered position.

Referring now to FIGS. 12 and 13, it is contemplated that the cover member 142 of the vertically adjustable seatback assembly 10 can include a retractable curtain 160 that operates to a refracted position 162 when the seatback 16 is in the lowered position 26. The retractable curtain 160 can operate to an extended position 164 when the seatback 16 is in the raised position. In such an embodiment, the retractable curtain 160 can include a spool 166 that is attached to at least one of the seat base 14 and the seatback 16. The spool 166 of the retractable curtain 160 can include a rotational biasing mechanism 168 that biases the spool 166 toward the retracted position 162 such that when the seatback 16 is moved from the raised to the lowered position 26, the rotational biasing mechanism 168 of the spool 166 can serve to automatically operate the retractable curtain 160 to the retracted position 162. In the various embodiments, the retractable curtain 160 can be made of various materials that can include, but are not limited to, leather, plastic, vinyl, cloth, and other similar materials that can be adapted to extend and retract around a rotationally biased spool 166. It is further contemplated that the retractable curtain 160 can have a finish that substantially matches the aesthetic scheme of the vehicle seat 12. In this manner, the retractable curtain 160 can be adapted to substantially conceal the space created between the vertically adjustable seatback assembly 10 and the seat base 14 when the seatback 16 is in the raised position 28.

In the various embodiments, it is contemplated that the vertically adjustable seatback assembly 10 can be installed in various vehicle seats 12 within the passenger cabin 46 of a vehicle 48. Such seats can include, but are not limited to, front driver's seat, front passenger seats, rear seats, third-row seats and other positions of seating of vehicle 48.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
    a seat base;
    a seatback;
    a vertical guide frame connecting a rear portion of the seat base to a bottom portion of the seatback, wherein the bottom portion of the seatback slidably engages and rotationally engages the vertical guide frame; and
    at least one actuator adapted to move the seatback between a plurality of vertical positions relative to the seat base, and wherein the seatback slidably engages the at least one actuator to define a plurality of angular positions of the seatback, wherein each at least one actuator includes an actuator base and an actuator piston, wherein the actuator piston is connected with the bottom portion of the seatback and the actuator base is connected with the vertical guide frame.

2. The vehicle seat of claim 1, wherein the bottom portion of the seatback includes at least one protrusion that engages a slot of the vertical guide frame, and wherein the protrusion slidably engages the slot to allow the seatback to operate between lowered and raised positions of the plurality of vertical positions.

3. The vehicle seat of claim 1, wherein the at least one actuator, the vertical guide frame and the bottom portion of the seatback define a pivot mechanism adapted to rotationally operate the seatback between a plurality of angular positions relative to the seat base.

4. The vehicle seat of claim 3, wherein each at least one actuator includes an actuator base and an actuator piston, wherein the actuator piston is connected with the bottom portion of the seatback and the actuator base is connected with the vertical guide frame, and wherein the pivot mechanism includes a groove defined within the bottom portion of the seatback that engages a pin disposed in a top portion of the actuator piston.

5. The vehicle seat of claim 1, further comprising:
    a cover member that at least partially extends between the bottom portion of the seatback and the rear portion of the seat base, wherein the cover member at least partially occupies a gap defined between the bottom portion of the seatback and the rear portion of the seat base.

6. The vehicle seat of claim 5, wherein the plurality of vertical positions includes lowered and raised positions, and wherein the cover member is a retractable curtain that operates to a retracted position when the seatback is in the lowered position and moves to an extended position when the seatback is in the raised position.

7. The vehicle seat of claim 5, wherein the plurality of vertical positions includes lowered and raised positions, and wherein the cover member is a cushion extending below the bottom portion of the seatback, wherein the cushion is in a compressed position when the seatback is in the lowered position and wherein the cushion is in a substantially uncompressed position when the seatback in is the raised position.

8. A vehicle seat comprising:
    a frame having a guide member operably connected to base and back sections; and
    a linear actuator having an actuator base coupled with the guide member and an actuator piston coupled to and vertically operating a bottom of the back section within the guide member between vertical positions of the back section, wherein the back section laterally and slidably engages the linear actuator to define rotational positions of the back section.

9. The vehicle seat of claim 8, wherein a bottom portion of the back section includes at least one protrusion that engages a slot of the guide member, and wherein the protrusion slidably engages the slot to allow the back section to operate between the plurality of vertical positions.

10. The vehicle seat of claim 9, wherein the protrusion extends at least partially through the slot.

11. The vehicle seat of claim 9, wherein each at least one actuator and the bottom portion of the seatback define a pivot mechanism adapted to rotationally operate the seatback between a plurality of angular positions relative to the base section, wherein the pivot mechanism is positioned below the protrusion.

12. The vehicle seat of claim 8, wherein the guide member is integrated into a frame of the base section.

13. The vehicle seat of claim 10, further comprising:
    a cover member that at least partially extends between the bottom portion of the seatback and a rear portion of the base section, wherein the cover member at least partially occupies a gap defined between the bottom portion of the seatback and the rear portion of the seat base.

14. A vehicle seat comprising:
    a guide member at least partially connecting a seatback to a seat base; and
    an actuator having an actuator base connected with the guide member and an actuator piston connected to and vertically operating a bottom portion of the seatback relative to the seat base, and wherein the seatback further engages the guide member and the actuator to define a plurality of angular positions of the seatback.

15. The vehicle seat of claim 4 wherein a bottom portion of the seatback includes at least one protrusion that engages the guide member, and wherein the at least one protrusion slidably engages the guide member to allow the seatback to operate between the plurality of vertical positions.

16. The vehicle seat of claim 15, wherein the actuator and the bottom portion of the seatback slidably engage in a lateral direction to define a pivot mechanism adapted to rotationally operate the seatback between a plurality of angular positions relative to the seat base, wherein the bottom portion of the seatback includes a groove that slidably receives a pin extending from a portion of the actuator.

17. The vehicle seat of claim 16, wherein the pivot mechanism includes the pin that extends from a top portion of the actuator piston into the groove of the bottom portion of the seatback.

18. The vehicle seat of claim 15, further comprising:
- a cover member that at least partially extends between the bottom portion of the seatback and a rear portion of the seat base, wherein the cover member at least partially occupies a gap defined between the bottom portion of the seatback and the rear portion of the seat base.

* * * * *